United States Patent
Li et al.

(10) Patent No.: US 11,849,448 B2
(45) Date of Patent: Dec. 19, 2023

(54) PREEMPTION INDICATION FOR DL MULTIPLEXING OF DIFFERENT TYPES OF TRAFFIC WITH NON-COHERENT JOINT TRANSMISSION

(71) Applicant: QUALCOMM Incorporated, San Diego, CA (US)

(72) Inventors: Qiaoyu Li, Beijing (CN); Chao Wei, Beijing (CN); Yu Zhang, Beijing (CN); Liangming Wu, Beijing (CN); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 17/272,024

(22) PCT Filed: Sep. 21, 2019

(86) PCT No.: PCT/CN2019/107130
§ 371 (c)(1),
(2) Date: Feb. 26, 2021

(87) PCT Pub. No.: WO2020/057660
PCT Pub. Date: Mar. 26, 2020

(65) Prior Publication Data
US 2021/0352695 A1   Nov. 11, 2021

(30) Foreign Application Priority Data
Sep. 22, 2018 (WO) ................ PCT/CN2018/107156

(51) Int. Cl.
*H04W 72/12* (2023.01)
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC .......................... H04W 72/1273; H04W 72/23
(Continued)

(56) References Cited

U.S. PATENT DOCUMENTS

| | | | |
|---|---|---|---|
| 2018/0270799 A1 | 9/2018 | Noh et al. | |
| 2019/0254081 A1* | 8/2019 | Li | H04W 72/0446 |
| 2019/0306848 A1* | 10/2019 | Zhou | H04W 72/044 |

FOREIGN PATENT DOCUMENTS

| | | |
|---|---|---|
| CN | 108513358 A | 9/2018 |
| WO | 2018093126 A1 | 5/2018 |

(Continued)

OTHER PUBLICATIONS

Huawei, et al., "Summary of Remaining Issues on Pre-Emption Indication", 3GPP TSG RAN WG1 Meeting #93, R1-1806897, May 25, 2018 (May 25, 2018), 3 Pages, the whole document.
(Continued)

*Primary Examiner* — Gbemileke J Onamuti
(74) *Attorney, Agent, or Firm* — QUALCOMM Incorporated

(57) ABSTRACT

Certain aspects of the present disclosure provide techniques for indicating a preemption of resources impacting a joint transmission from multiple transmitting entities to a user equipment. The transmitting entities may be associated with a virtual cell ID or a demodulation reference signal (DMRS) port group ID.

30 Claims, 12 Drawing Sheets

(58) Field of Classification Search
USPC ........................................................ 370/330
See application file for complete search history.

(56) References Cited

FOREIGN PATENT DOCUMENTS

| WO | 2018093162 | A1 | 5/2018 | |
| WO | WO-2018129325 | A1 * | 7/2018 | ........... H04L 1/0013 |
| WO | 2018158926 | A1 | 9/2018 | |
| WO | 2019241189 | | 12/2019 | |

OTHER PUBLICATIONS

International Search Report and Written Opinion—PCT/CN2018/107156—ISA/EPO—dated Mar. 27, 2019.
International Search Report and Written Opinion—PCT/CN2019/107130—ISA/EPO—dated Dec. 23, 2019.
Potevio: "Discussion on UL Pre-Emption for URLLC Reliability", 3GPP TSG RAN WG1 Meeting #93, R1-1807228, May 25, 2018 (May 25, 2018), 3 Pages, the whole document.
ETRI: "Discussion on PDCCH Enhancements for URLLC", 3GPP TS RAN WG1 Meeting #94, R1-1808815 Final, 3rd Generation Partnership Project, Mobile Competence Centre, 650, Route Des Lucioles, F-06921 Sophia-Antipolis Cedex, vol. RAN WG1, No. Gothenburg, Sweden, Aug. 20, 2018-Aug. 24, 2018, 5 Pages, Aug. 10, 2018, XP051516188.
Supplementary European Search Report—EP19862697—Search Authority—The Hague—dated May 23, 2022.
VIVO: "Multiplexing Data with Different Transmission Durations", 3GPP TSG RAN WG1 Meeting AH 1801, R1-1800205_Multiplexing Data With Different Transmission Durations, 3rd Generation Partnership Project, Mobile Competence Centre, 650, Route Des Lucioles, F-06921 Sophia-Antipolis, vol. RAN WG1, No. Vancouver, Canada, Jan. 22-26, 2018, Jan. 13, 2018, XP051384694, 6 Pages.

* cited by examiner

PREEMPTION INDICATION FOR DL MULTIPLEXING OF DIFFERENT TYPES OF TRAFFIC WITH NON-COHERENT JOINT TRANSMISSION

CROSS REFERENCE TO RELATED APPLICATIONS

This application is a national stage application under 35 U.S.C. 371 of PCT/CN2019/107130, filed Sep. 21, 2019, which claims priority to International Application No. PCT/CN2018/107156 filed Sep. 22, 2018, which are assigned to the assignee of the present application and is expressly incorporated by reference herein in their entireties.

FIELD OF THE DISCLOSURE

Aspects of the present disclosure relate to wireless communications, and more particularly, to techniques for indicating a preemption of resources impacting a joint transmission from multiple transmitting entities to a user equipment.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS). The method generally includes determining resources for a scheduled joint data transmission of a first type from a group of transmitting entities to a user equipment (UE) overlap with resources for a scheduled data transmission of a second type from at least a first transmitting entity of the group of transmitting entities to the UE and providing a downlink preemption indication (DLPI) to the UE that indicates that, for at least the first transmitting entity, the scheduled data transmission of the second type preempts the scheduled data transmission of the first type on the overlapping resources.

Certain aspects provide a method for wireless communication by a user equipment (UE). The method generally includes receiving a downlink preemption indication (DLPI) that indicates that resources for a scheduled joint data transmission of a first type from a group of transmitting entities to the UE that overlap with resources for a scheduled data transmission of a second type from at least a first transmitting entity of the group of transmitting entities to the UE are preempted by the scheduled data transmission of the second type on the overlapping resources and processing the joint data transmission in accordance with the preemption indicated by the DLPI.

Aspects also include various apparatuses, means, and computer readable mediums having instructions for performing the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
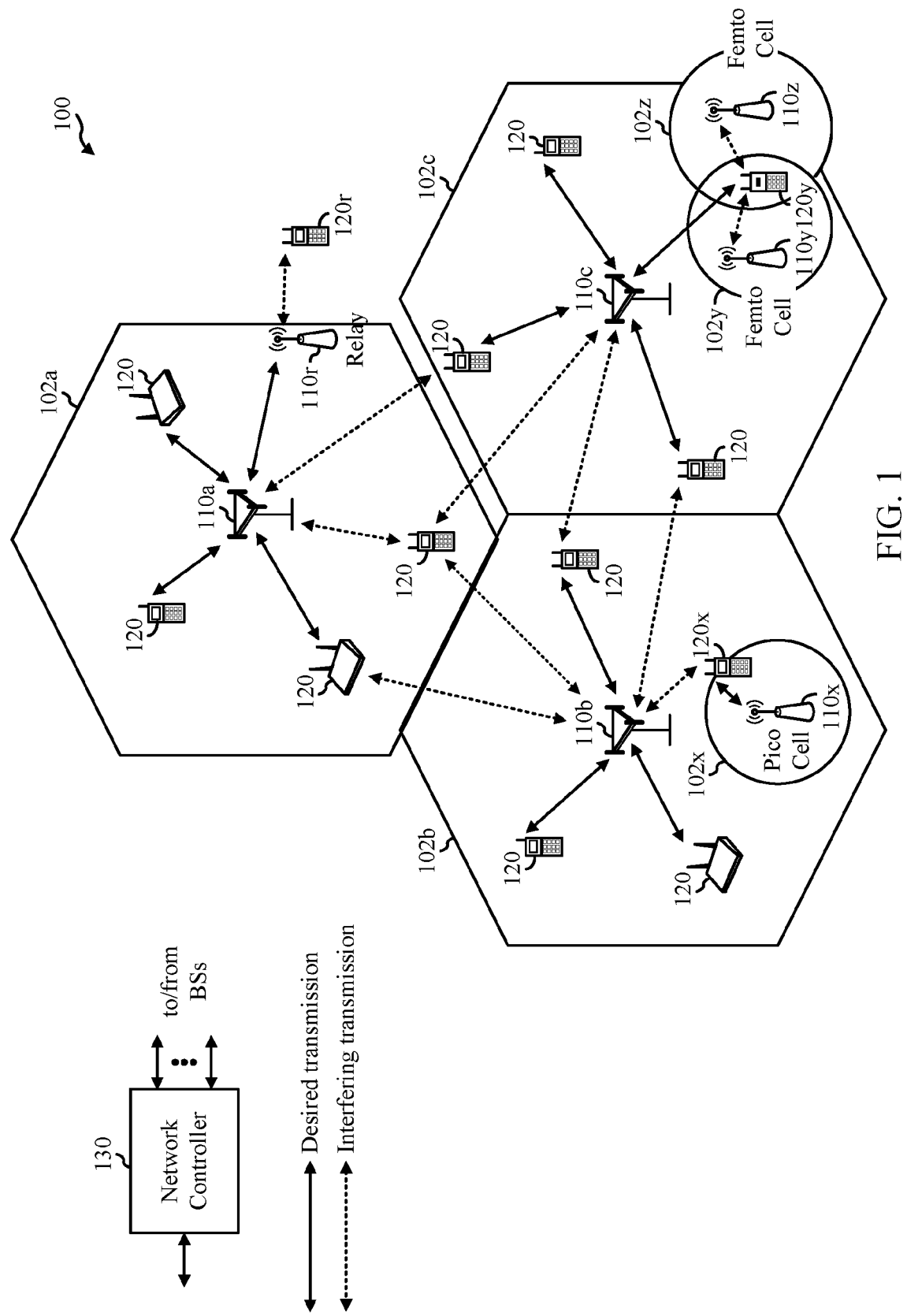
FIG. 1 is a block diagram conceptually illustrating an example telecommunications system, in accordance with certain aspects of the present disclosure.

Aspects of the present disclosure provide apparatus, methods, processing systems, and computer readable mediums for signaling a downlink preemption indication (DLPI) for non-coherent joint transmissions (NC-JT).

In certain systems, such as NR (new radio or 5G) systems, a scheduled PDSCH may be preempted by another PDSCH transmission. For example, NR supports a variety of services (service types) including enhanced mobile broadband (eMBB) and ultra-reliable low-latency communications (URLLC). An eMBB PDSCH may be preempted by a URLLC PDSCH. The base station (BS) provides a downlink preemption indicator (DLPI) to the user equipment (UE), indicating the preempted resources, which may help improve decoding performance at the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100, such as a New Radio (NR) or 5G network, in which aspects of the present disclosure may be performed.

For example, the wireless communication network 100 may support enhanced mobile broadband (eMBB) and ultra-reliable low-latency communication (URLLC) services. A base station (BS), such as a BS 110 may schedule physical downlink shared channel (PDSCH) transmission to a user equipment (UE), such as a UE 120. The BS 110 may preempt the scheduled PDSCH with another PDSCH. For example, the BS 110 may schedule an eMBB PDSCH in a slot, then the BS 110 may transmit a URLLC PDSCH in one more symbols of the slot scheduled for the eMBB PDSCH, the URLLC PDSCH preempting the eMBB PDSCH.

In such cases, the BS 110 may send the UE 120 a downlink preemption indictor (DLPI) indicating the preempted resources. The BS 110 may ensure that the UE 120 can process the PDSCH taking into account the preempted resources. For example, the BS 110 determines a feedback timing indicator associated with the scheduled PDSCH. The BS 110 may determine the feedback timing indicator based on the number of slots between the scheduled PDSCH and the DLPI and on the minimum processing time associated with the UE. The BS 110 includes the feedback timing indicator in the downlink control information (DCI) scheduling the PDSCH. The UE 120 can determine when to process the PDSCH based on the feedback timing indicator.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110$a$, 110$b$ and 110$c$ may be macro BSs for the macro cells 102$a$, 102$b$ and 102$c$, respectively. The BS 110$x$ may be a pico BS for a pico cell 102$x$. The BSs 110$y$ and 110$z$ may be femto BSs for the femto cells 102$y$ and 102$z$, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110$r$ may communicate with the BS 110$a$ and a UE 120$r$ in order to facilitate communication between the BS 110$a$ and the UE 120$r$. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120$x$, 120$y$, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
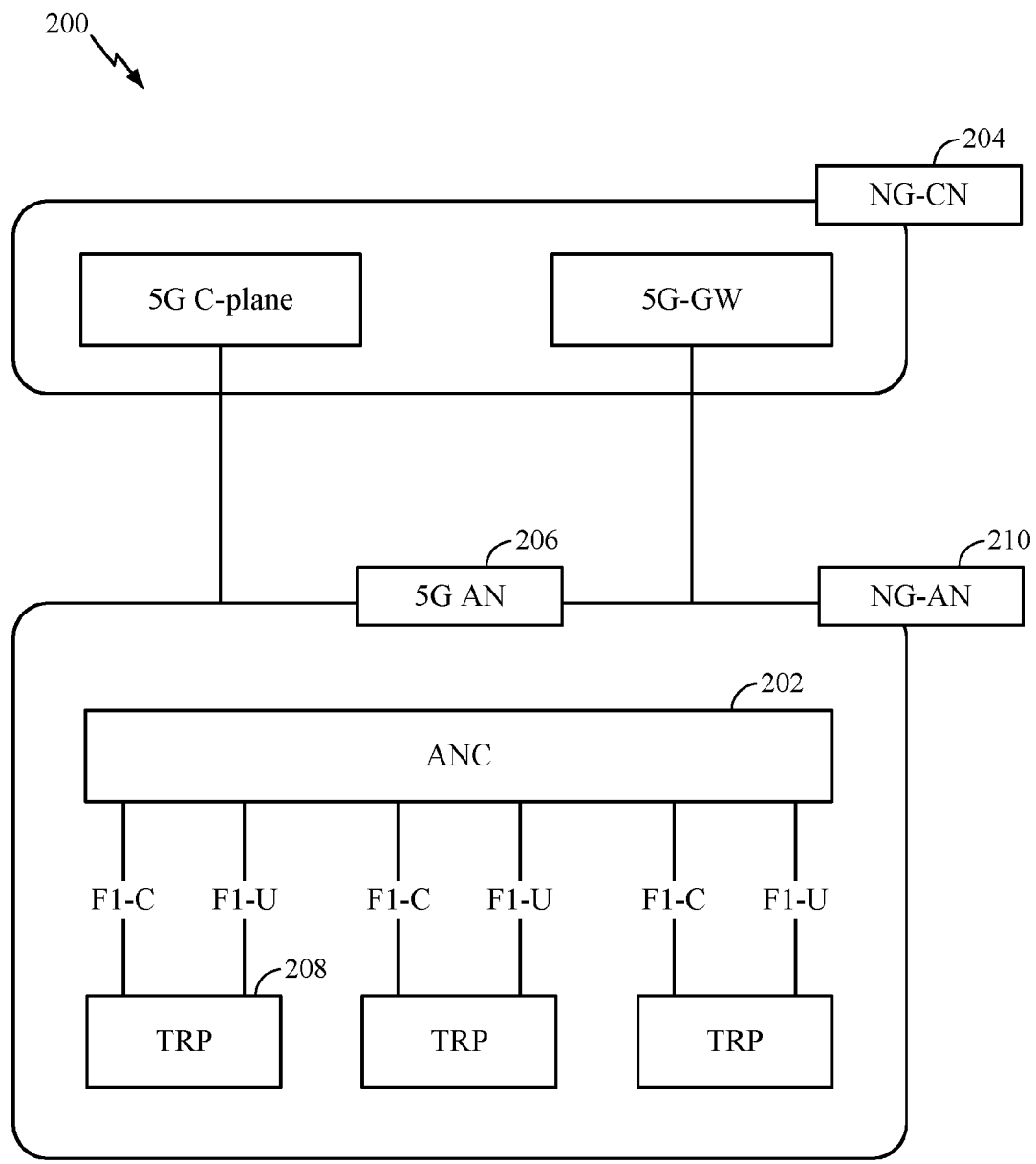
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an ANC 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
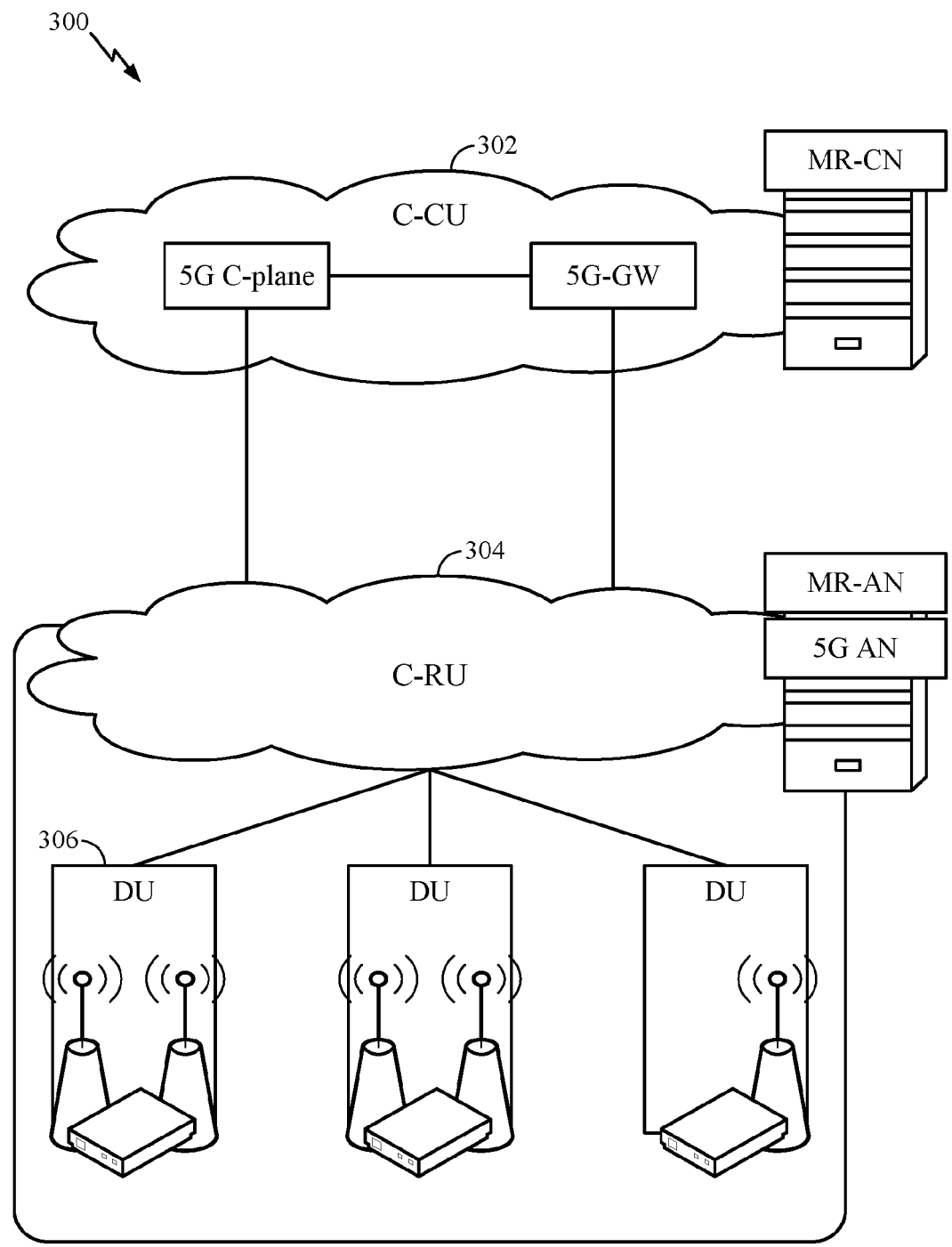
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
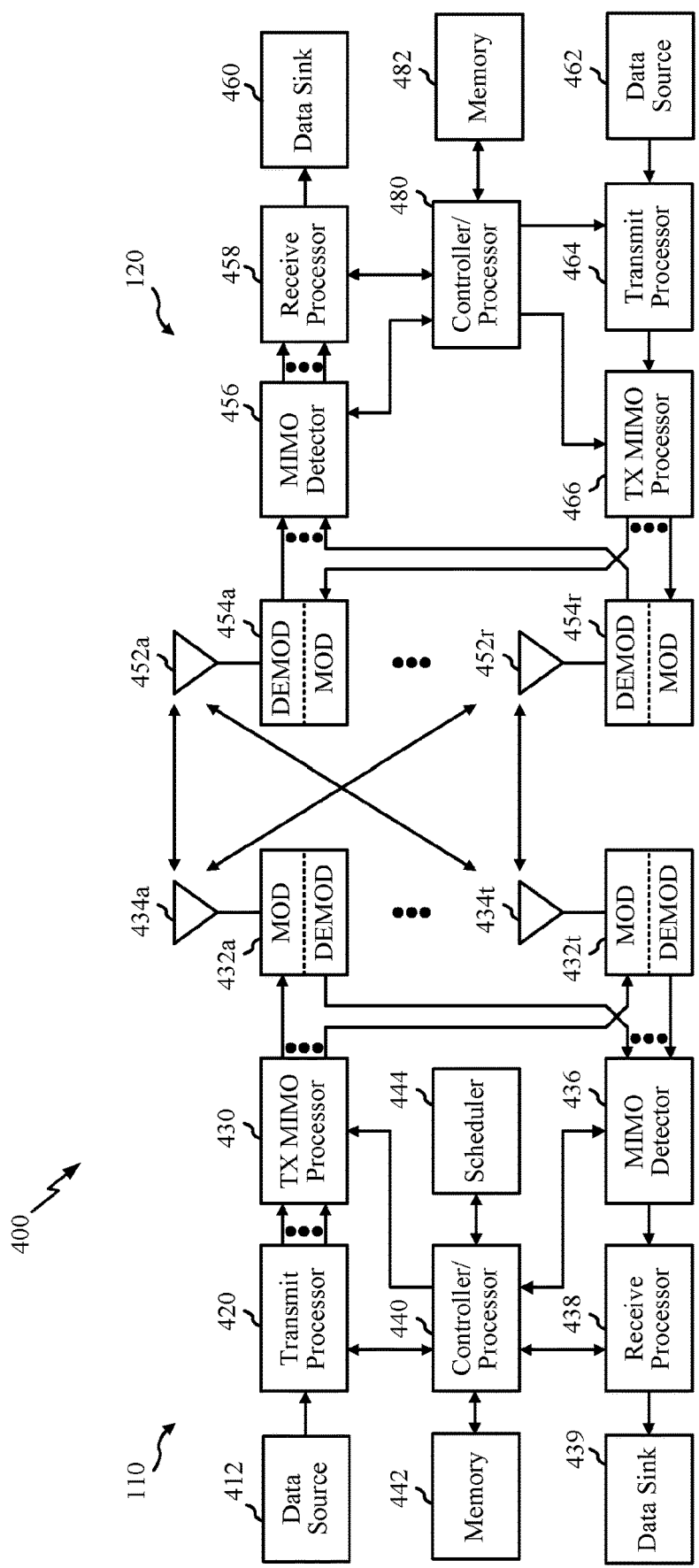
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein for PDSCH processing in the presence of DLPI (e.g., according to the operations shown in FIGS. 9 and 8).

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
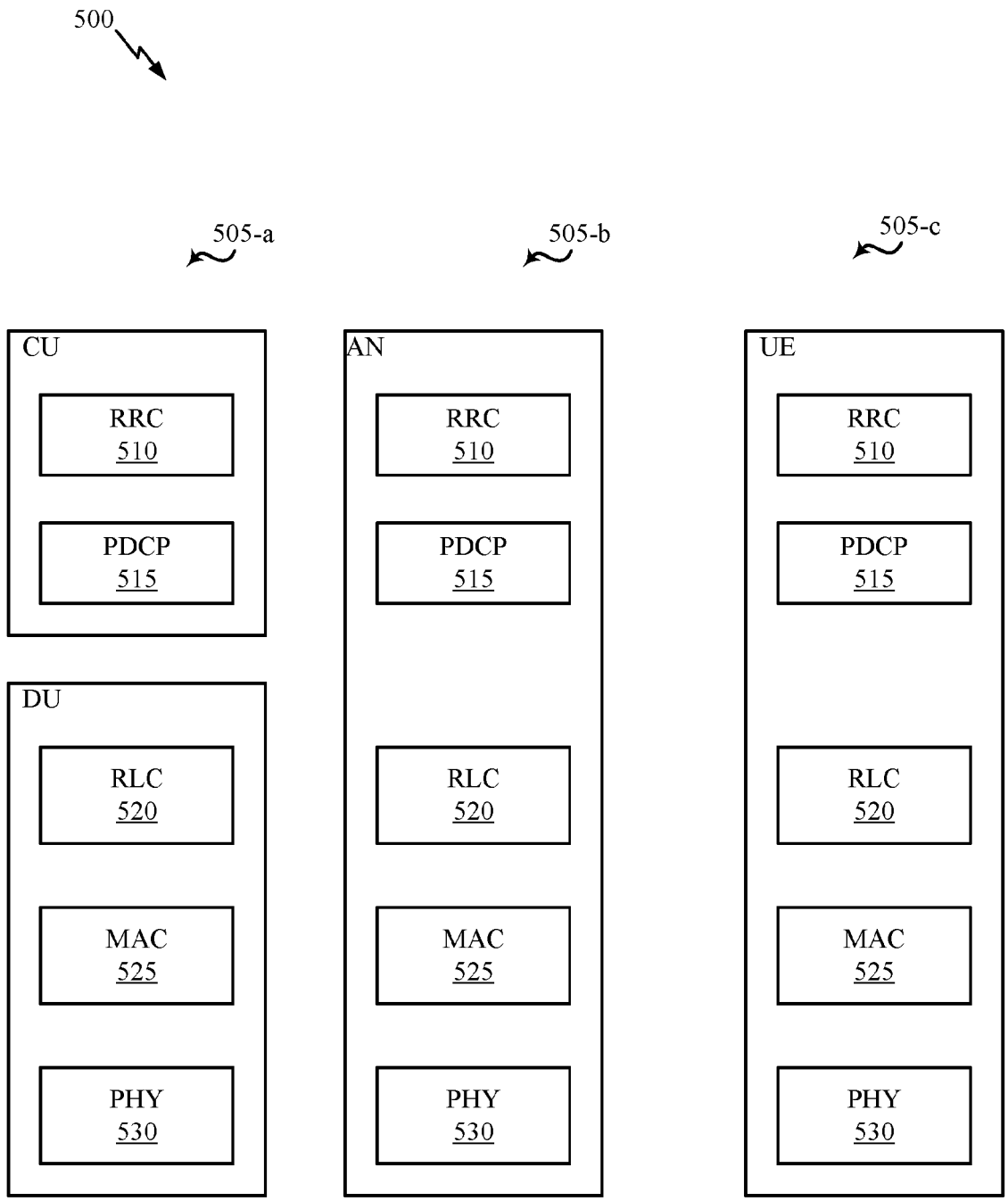
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
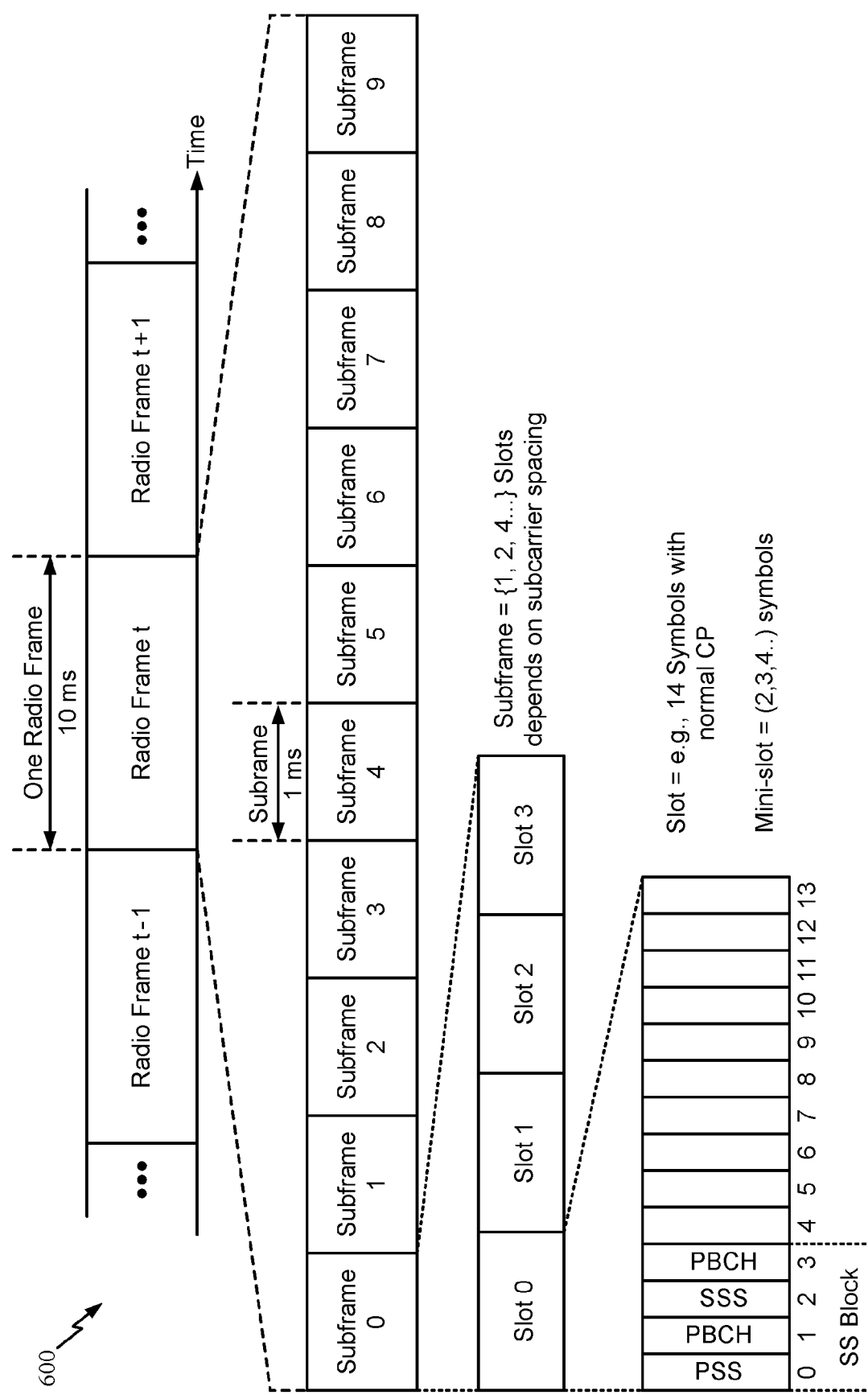
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information (SI), such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a PDSCH in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Preemption Indication Signaling for NC-JT

Certain aspects of the present disclosure provide techniques for indicating a preemption of downlink resources impacting a joint transmission from multiple transmitting entities to a user equipment. The transmitting entities may be associated with a virtual cell ID or a demodulation reference signal (DMRS) port group ID and, in some cases, may be referred to herein as a transmitter receiver point (TRP). As will be described herein, an eMBB UE can improve decoding performance by taking the indicated preempted resources into account.

In certain systems, such as NR (new radio or 5G) systems, a scheduled PDSCH may be preempted by another PDSCH transmission. For example, NR supports a variety of services including enhanced mobile broadband (eMBB) and ultra-reliable low-latency communications (URLLC). An eMBB PDSCH may be preempted by a URLLC PDSCH, in a manner prioritizing URLLC traffic over eMBB traffic. Preemption, in this context, means that the entity transmitting eMBB data in PDSCH would stop (or at least puncture portions of) its eMBB transmission on the symbols preempted by URLLC-and a UE receiving the PDSCH interprets the preemption indication in this manner, allowing it to consider this when decoding.

In current systems, for an eMBB UE, if URLLC transmits data on its scheduled DL, the preemption is indicated to this UE in the following Group-Common DCI (GC-DCI), to be monitored by the UE using an RRC configured radio Network Temporary Identifier (RNTI), which may be referred to as an interruption RNTI (int-RNTI).

For a serving cell, the preemption indication is provided as an {M,N} bit-map, representing M time-domain parts and N frequency-domain parts regarding the last GC-DCI periodicity. The bitmap is overall 14-bits, taking a single slot with 14 OFDM symbols for example:
={M,N} for 14 OFDM symbols; Or
{M,N}={7,2} for each 2 OFDM symbols, and 2 subsets of PRBs per 2 OFDM symbols.
More slots can be indicated with more symbols per bit to be indicated, depending on the GC-DCI periodicity.

In multi-TRP non-coherent joint transmission (NC-JT) schemes, multiple TRPs non-coherently transmit different codewords (CWs), or different parts of a CW, or different/same redundancy versions (RVs) of a same CW to the UE.

In a Multi-TRP scenario with DL URLLC and eMBB multiplexing, a certain symbol in the eMBB PDSCH may be interrupted by URLLC, which may be transmitted from a single TRP, several TRPs, or all TRPs.

Current preemption indications do not support TRP-specific preemption indication, especially for the cases where TRPs share the same serving cell ID. Thus UE has to assume all TRPs are interrupted.

Figure 7:
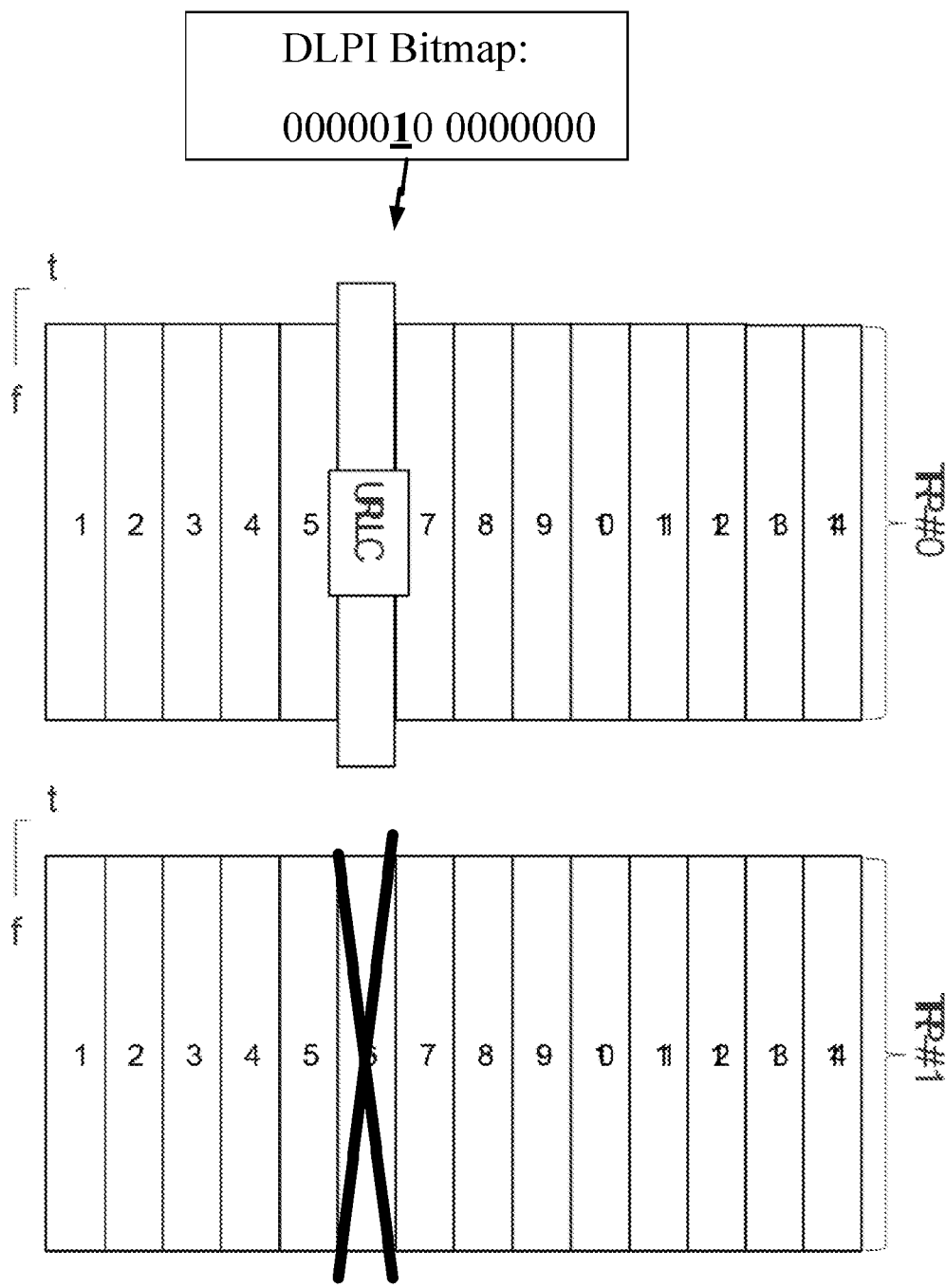
FIG. 7 is an example of downlink preemption indication (DLPI).

This is illustrated by the example shown in FIG. 7, when both URLLC and eMBB traffic are present. The illustrated example shows 2-TRPs, each transmitting a different CW using a single layer to the UE. Preemption indication periodicity is 1-slot. In this example, the 6th symbol of the considered slot is interrupted by URLLC regarding TRP-#0, but not for TRP-#1. As illustrated, assuming a bitmap of {M,N}={14,1} is considered, the current type preemption indication would be:
0000010 0000000
Unfortunately, as indicated by the "X" in FIG. 7, because the preemption indication is not TRP-specific, the UE would have to consider the 6th symbol is also interrupted regarding the layer on TRP-#1, even though this is not the case. Thus, the decoding performance will be degraded and resources may be wasted.

Aspects of the present disclosure, however, provide techniques that may help avoid such degradation by signaling a preemption indication in a manner that allows a UE to identify which transmitting entity (e.g., TRP) is actually interrupted. Taking this into account a UE may improve decoding performance and better utilize resources.

Figure 8:
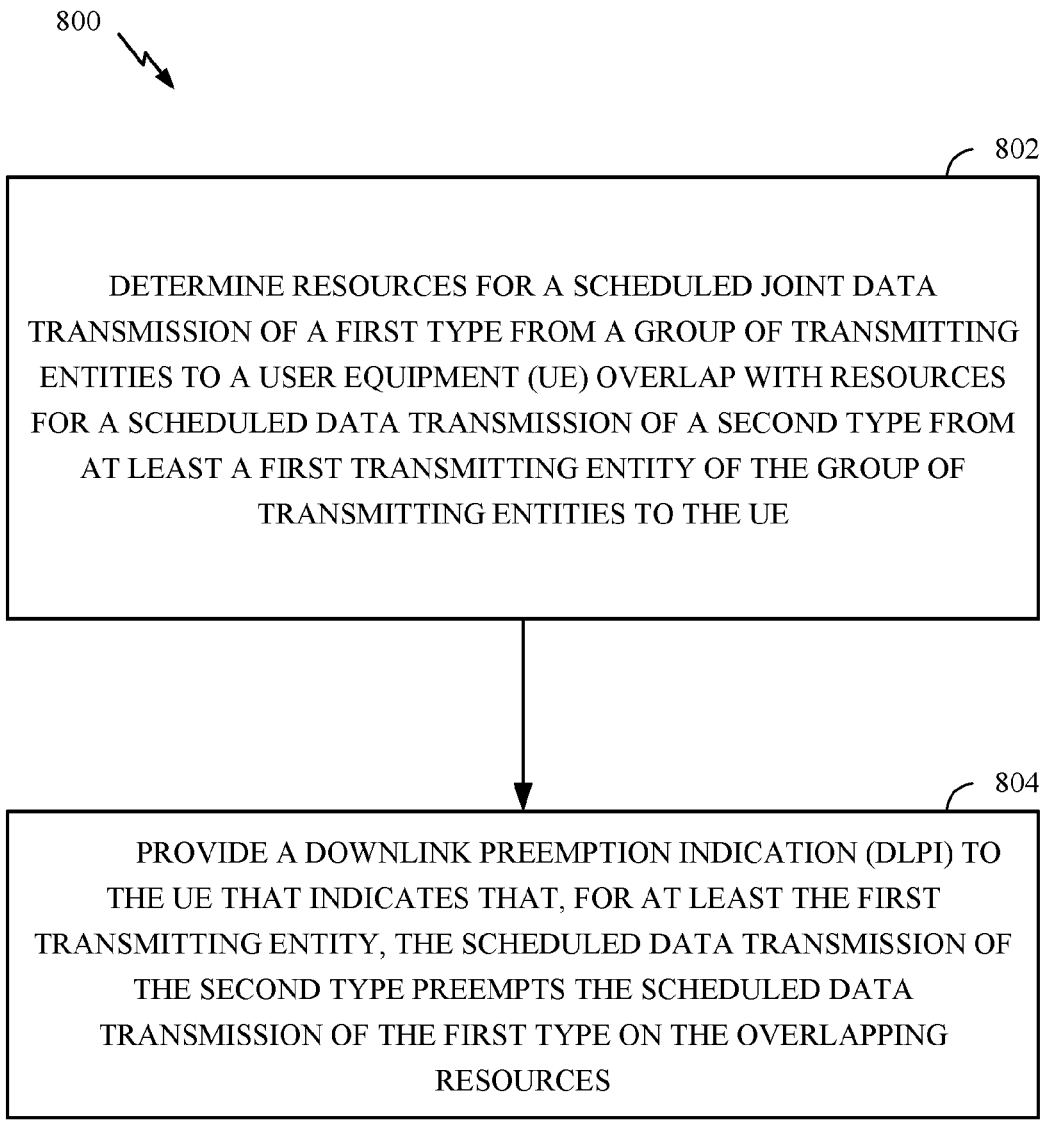
FIG. 8 illustrates example operations for wireless communication by a network entity, in accordance with certain aspects of the present disclosure.

FIG. 8 is a flow diagram showing example operations 800 for wireless communications by a network entity, in accordance with certain aspects of the present disclosure. The operations 800 may be performed by a transmitting entity, such as a BS 110 of FIG. 1 or TRP 208 of FIG. 2.

Operations 800 begin, at 802, by determining resources for a scheduled joint data transmission of a first type from a group of transmitting entities to a user equipment (UE) overlap with resources for a scheduled data transmission of a second type from at least a first transmitting entity of the group of transmitting entities to the UE. At 804, the transmitting entity provides a downlink preemption indication (DLPI) to the UE that indicates that, for at least the first transmitting entity, the scheduled data transmission of the second type preempts the scheduled data transmission of the first type on the overlapping resources.

Figure 9:
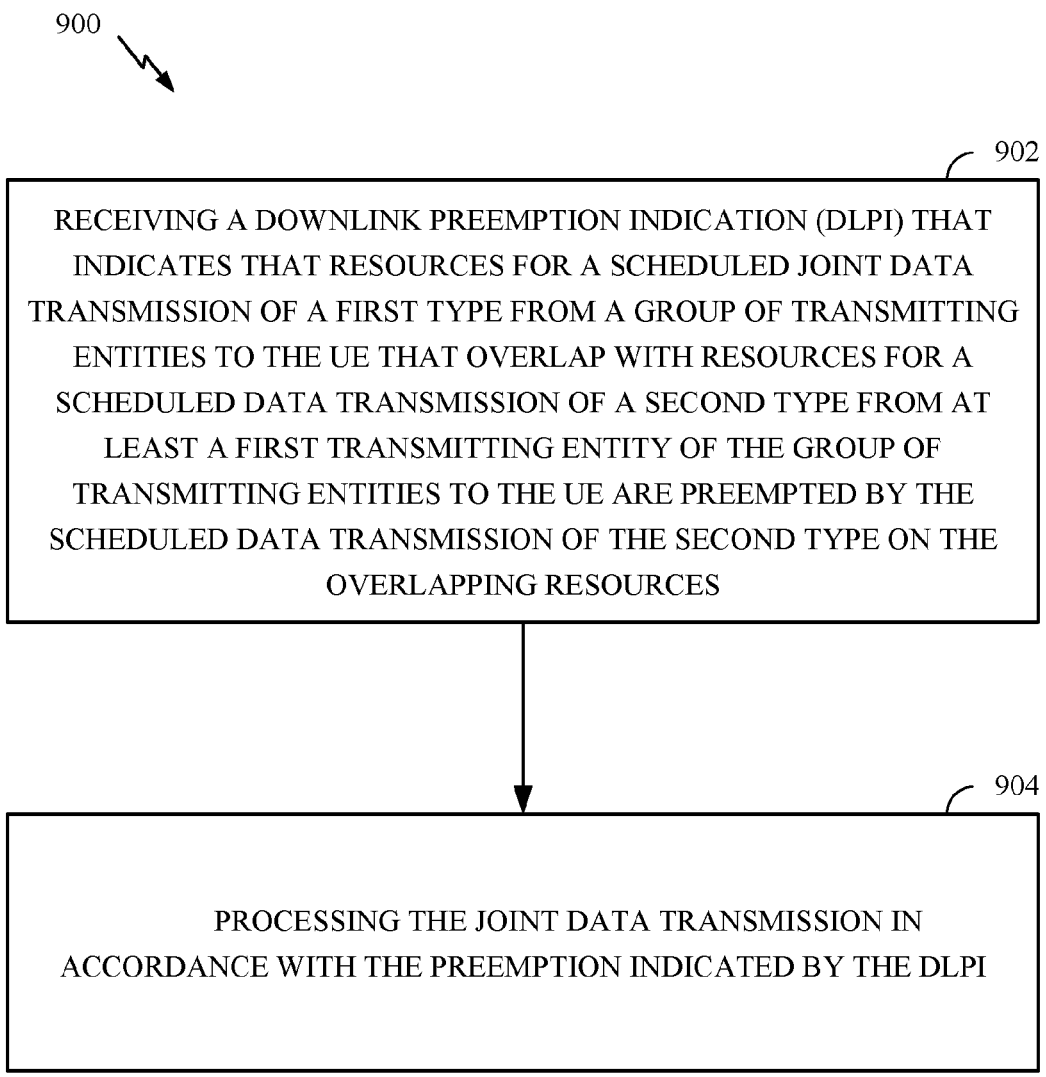
FIG. 9 illustrates example operations for wireless communication by a user equipment, in accordance with certain aspects of the present disclosure.

FIG. 9 is a flow diagram showing example operations 900 for wireless communications by a user equipment (UE), in accordance with certain aspects of the present disclosure. Operations 900 may be performed, for example, by a UE such as a UE 120 of FIG. 1 to process transmission sent via NC-JT (e.g., by a TRP performing operations 800 of FIG. 8).

Operations 900 may begin, at 902, by receiving a downlink preemption indication (DLPI) that indicates that resources for a scheduled joint data transmission of a first type from a group of transmitting entities to the UE that overlap with resources for a scheduled data transmission of a second type from at least a first transmitting entity of the group of transmitting entities to the UE are preempted by the scheduled data transmission of the second type on the overlapping resources. At 904, the UE processes the joint data transmission in accordance with the preemption indicated by the DLPI.

Various solutions are provided to help improve decoding of NC-JT in the event of preemption. For example, according to a first solution (referred to herein as Solution-A), bits may be added in the Group-Common DCI for additional TRP-specific preemption indication (or such additional indications may be provided via RRC configurations). While various examples described herein refer to 2 TRP scenarios, the signaling mechanisms may be readily extended to multi-TRP scenarios with more than 2 TRPs.

Solution A may be applied in various scenarios, including a relatively simple NC-JT case with 2-TRPs. In a first solution, the indication of which of the 2-TRPs may be subject to preemption may be provided as a 1-bit indication. According to a first option, the corresponding bit values may be interpreted as follows:

"0" →The time-frequency preemption indication is regarding TRP-#0, while TRP-#1 is not interrupted.
"1" →The time-frequency preemption indication is regarding TRP-#1, while TRP-#0 is not interrupted.

According to a second option, the bit may be interpreted as follows:

"0" →The time-frequency preemption indication is regarding a single TRP of the 2 TRPs.
"1" →the time-frequency preemption indication is regarding both TRPs.

In second solution, the indication of which of the 2-TRPs may be subject to preemption may be provided as a 2-bit indication. In such cases, the bit value combinations may be interpreted as follows:

"00" →The time-frequency preemption indication is regarding TRP-#0, while TRP-#1 is not interrupted.
"01" →The time-frequency preemption indication is regarding TRP-#1, while TRP-#0 is not interrupted.
"11" →The time-frequency preemption indication is regarding both TRPs.

In a third solution, an M-bit indication may be provided for the {M,N} time-frequency bit-map. In this case, each bit may be associated to a certain bit or bit-pair within the preemption time-frequency bit-map. The bit pairs may be interpreted according to various options. According to a first such option, the bit pairs may be interpreted as:

"0"→the associated bit/bit-pair is regarding TRP-#0;
"1"→the associated bit/bit-pair is regarding TRP-#1;

According to a second such option, the bit pairs may be interpreted as:

"0"→the associated bit/bit-pair is regarding a single TRP of the 2 TRPs;
"1"→the associated bit/bit-pair is regarding both TRPs.

In a fourth solution, 2M-bits may be provided as indication for the {M,N} time-frequency bit-map. In this case, each 2-bits are associated to a certain bit or bit-pair within the time-frequency bit-map. The associated bit/bit-pair may be interpreted as:

"00" →regarding TRP-#0.
"01" →regarding TRP-#1.
"11" →regarding both TRPs.

According to a fifth solution, each TRP is associated with its own {M,N} bit-map for TRP-specific preemption indication.

As noted above, these solutions may be extended to the case of 3-TRPs (TRP-#0, TRP-#1, and TRP-#2) as follows. For a one bit indication, the time-frequency preemption indication may be interpreted as:

"0" →a single TRP of the 3 TRPs.
"1" →All TRPs.

For a 2-bits indication, the time-frequency preemption indication may be interpreted according to various options, such as:

Opt-1: "00"→TRP-#0; "01"→TRP-#1; "10"→TRP-#2; "11"→All TRPs.
Opt-2: "01"→one of the 3 TRPs; "10"→of the 3 TRPs; "11"→All of the 3 TRPs.

For the 3-TRP case, a 3-bit indication may also be provided. In this case, the time-frequency preemption indication may be interpreted as:

"000"→TRP-#0; "001"→TRP-#1; "010"→TRP-#2; "011"→TRP-#0
"100"→TRP-#0 "101"→TRP-#1 "111"→All 3 TRPs.

For an M-bits indication for the {M,N} time-frequency bit-map, each bit may be associated with a certain bit or bit-pair within the time-frequency bit-map. The associated bit/bit-pair may be interpreted as:

"0"→a single TRP of the 3 TRPs; "1"→All TRPs.

For 2M-bits indication for the {M,N} time-frequency bit-map, each 2-bits may be associated with a certain bit or bit-pair within the time-frequency bit-map. The associated bit/bit-pair may be interpreted according to options, such as:

Opt-1: "00"→TRP-#0; "01"→TRP-#1; "10"→TRP-#2; "11"→All TRPs.
Opt-2: "01"→one of the 3 TRPs; "10"→2 of the 3 TRPs; "11"→All of the 3 TRPs.

For the 3 TRP case, a 3M-bits indication for the {M,N} time-frequency bit-map may be provided. In this case, each 2-bits may be associated with a certain bit or bit-pair within the time-frequency bit-map. The associated bit/bit-pair may be interpreted as:

"000"→TRP-#0; "001"→TRP-#1; "010"→TRP-#2; "011"→TRP-#0

"100"→TRP-#0 "101"→TRP-#1 "111"→All 3 TRPs.

As with the 2 TRP example described above, for the 3 TRP case, each TRP may also be associated to an {M,N} bit-map for TRP-specific preemption indication.

In the case that each TRP is associated with its own bit-map, there are various mechanisms to indicate which TRP a given bit-map is associated with. For example, in some cases, each TRP may be assigned a TRP-specific-RNTI. UEs served by certain TRPs may be RRC configured with such RNTIs associated to the corresponding TRPs, and use these RNTIs to monitor the TRP-specific preemption indication. The preemption indication bit-map associated with a certain TRP is scrambled by the corresponding TRP-specific-RNTI.

The preemption indication bit-maps associated to different TRPs can be placed in a single GC-DCI, or in separate GC-DCIs (e.g., where each DCI is associated to a certain TRP). A UE uses the TRP-specific-RNTIs RRC configured by the network to monitor the GC-DCI(s) for preemption indication regarding multiple TRPs.

Another mechanism to indicate which TRP a given bit-map is associated with is by the use of a TRP-specific index of a (larger) preemption indication bit-map. In this case, all preemption indications regarding different TRPs may be placed in a single GC-DCI. Each preemption indication bit-map regarding a certain TRP is associated w an index. UEs served by certain TRPs may be RRC configured with the preemption indication bit-map indexes associated to such TRPs. The UE can use the RRC configured indexes to monitor the GC-DCI for TRP-specific preemption indication.

Figure 10:
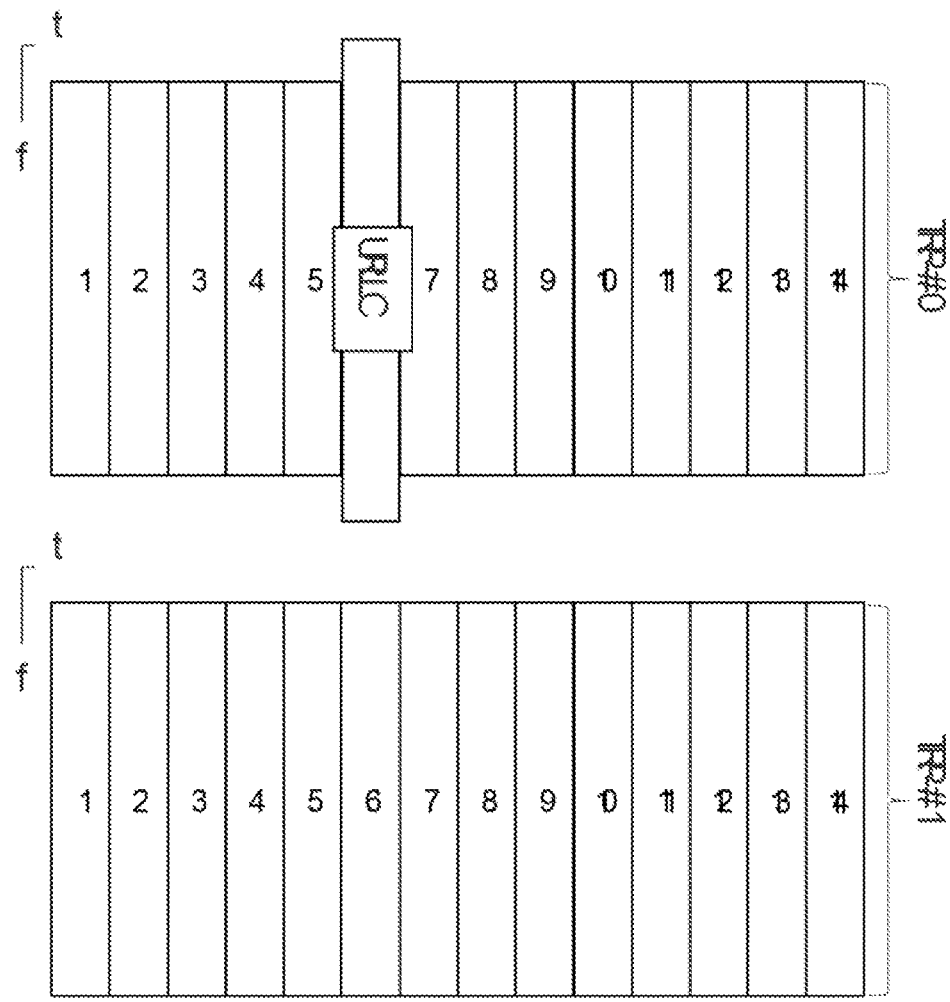
FIGS. 10-12 illustrate examples of downlink preemption indication (DLPI), in accordance with certain aspects of the present disclosure.

FIG. 10 illustrates how the TRP-specific preemption provided herein may benefit a UE. As illustrated, using the various TRP-specific signaling techniques, the UE may become aware that the 6th symbol is preempted for URLLC for TRP0 only (thus no "X" in symbol 6 for TRP1). The example assumes the same scenario as in the example illustrated in FIG. 7. Signaled values for the preemption indication according to the various solutions of Solution-A are shown. For the 1 bit options, the indications may be:

Opt-1: "0"+"0000010 0000000".

Opt-2: "0"+"0000010 0000000".

For the 2-bit solution:

"00"+"0000010 0000000".

For the M-bit "bit-pair" solution:

Opt-1: "xxxxx0x xxxxxxx"+"0000010 0000000"

Opt-2: "xxxxx0x xxxxxxx"+"0000010 0000000"

In these examples, the "x" means either "0" or "1" would be fine as the associated bit has no preemption indicated (as indicated by the 0 in the bit map on the right). For the "2M bit solution" the indication may be as:

"xx_xx_xx_xx_xx_00_xx_xx_xx_xx_xx_xx_xx_xx"+ "0000010 0000000".

where "xx" means "00" or "01" or "11" or "10" would be fine as the associated bit has no preemption indicated (as indicated by the 0 in the bit map on the right). For the solution where each TRP is associated with a bit map, the indication may be signaled as:

"0000010 0000000"+"0000000 0000000"

Another solution, referred to as Solution B, is to provide a new interpretation of the existing bitmap, rather than add additional bits. In Solution B, the {M,N} bit-map may be reused, but with different interpretations to the bit-points, so that TRP-specific preemption indication can be realized with reduced frequency/time domain indication granularity.

Again, the case of 2-TRPs may be considered. In this case, the 14-bit bit-map, may always be interpreted as a {7,2} bit-map, but with a new interpretation as follows. The number of symbol(s) for preemption indication by each bit-pair may be the same comparing to the existing bit-map with {7,2} setup. However, only all the occupied PRBs can be indicated (e.g., no more capability of indicating 2 separate subsets of PRBs).

If a bit-map as {M,N}={14,1} is configured with such a new interpretation, then the number of symbol(s) for preemption indication by each bit-pair is doubled comparing to the existing bit-map with {14,1} setup. In this case, each bit-pair stands for a TRP-specific preemption indication regarding the associated symbol(s) with the following interpretations:

"10"→Preemption for TRP-#0, no preemption for TRP-#1.

"01"→Preemption for TRP-#1, no preemption for TRP-#0.

"11"→Preemption for both TRP-#0 and TRP-#1.

"00"→No preemption for neither TRP-#0 nor TRP-#1.

For the case of 3-TRPs, the 14-bit bit-map may be always interpreted as a {7,2} bit-map, but with new interpretation as follows. The number of symbol(s) for preemption indication by each bit-pair may be the same as compared to the existing bit-map with {7,2} setup. But only all the occupied PRBs may be indicated (e.g., no more capability of indicating 2 separate subsets of PRBs).

If a bit-map as {M,N}={14,1} is configured with new interpretation, then the number of symbol(s) for preemption indication by each bit-pair may be doubled when compared to the existing bit-map with {14,1} setup. In this case, each bit-pair may stand for a TRPs-specific preemption indication regarding the associated symbol(s) with the following interpretations:

"10"→Preemption for TRP-#0, no preemption for TRP-#1 or TRP-#2.

"01"→Preemption for TRP-#1, no preemption for TRP-#0 or TRP-#2.

"11"→Preemption for TRP-#2, no preemption for TRP-#0 or TRP-#1.

"00"→No preemption for TRP-#0, or TRP-#1, or TRP-#2.

There are various mechanisms available to configure a UE to reuse the current Bit-Map with the new interpretations described above. One option is to use a new RNTI. In other words, for Solution-B, a new type of RNTI for multi-TRP interrupted transmission indication may be provided. For example, a Multi-TRP-int-RNTI, can be RRC configured to the UE. In this case, all UEs served by the same multiple TRPs may be configured the same Multi-TRP-int-RNTI. The bit-map proposed can be scrambled by the Multi-TRP-int-RNTI for the associated UEs to monitor. And the UE monitors the associated GC-DCI based on the Multi-TRP-int-RNTI.

Another option is for the UE to automatically perform interpretation according to Solution-B when appropriate. For example, when the UE identifies that it is working in a multi-TRP scenario (e.g., it sees different DMRS port group indexes with respect to different layers), it may automatically interpret the bit-maps as proposed.

Figure 11:
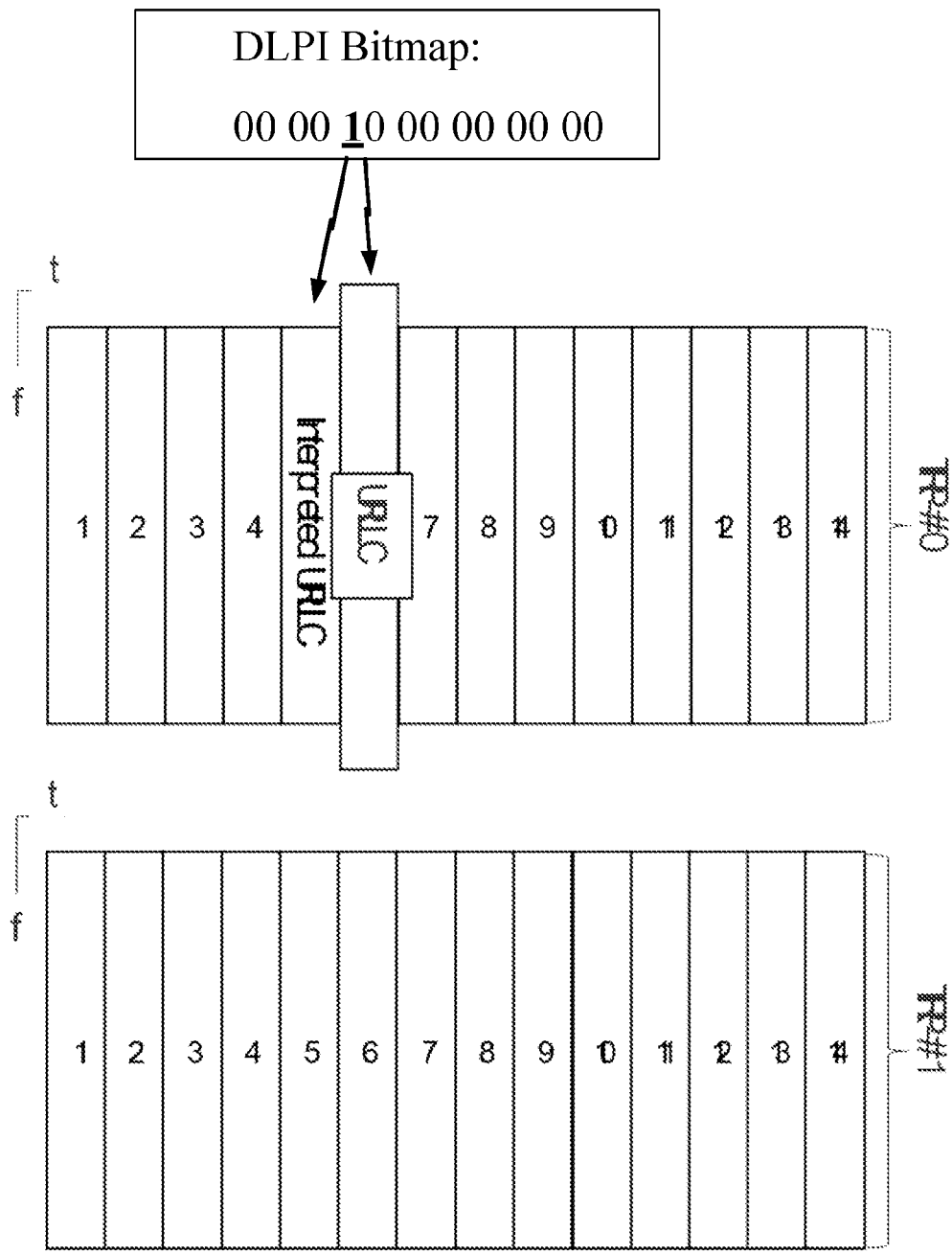

The example shown in FIG. 11 illustrates preemption signaling according to Solution B. The example, again, assumes the scenario described above for FIGS. 7 and 10. In an existing approach, the {M,N}={14,1} bit-map is capable of indicating 1-slot preemptions with a per symbol granularity. In this case, preemption indication according to Solution-B is:

"00 00 10 00 00 00 00".

Using Solution-B, the time-domain indication granularity is decreased, and the UE shall assume that both the 5th and the 6th symbols are interrupted on TRP-#0. On the other hand, UE is still able to interpret that TRP-#1 is still not interrupted.

Yet another solution, referred to herein as Solution-C is to reuse the existing {M,N} bit-map bits. With this solution, if URLLC is encountered by one TRP, the network (transmitting entities) also stops the eMBB transmission on the other TRPs. In this case, the UE may interpret the bit-map as all TRPs are interrupted. Following this, however, the network can also transmit URLLC on all TRPs, using the same DMRS port for diversity enhancement. This approach may be considered a new transmission scheme, where transmissions from different TRPs use the same DMRS port. This approach may be transparent to the UE.

Figure 12:
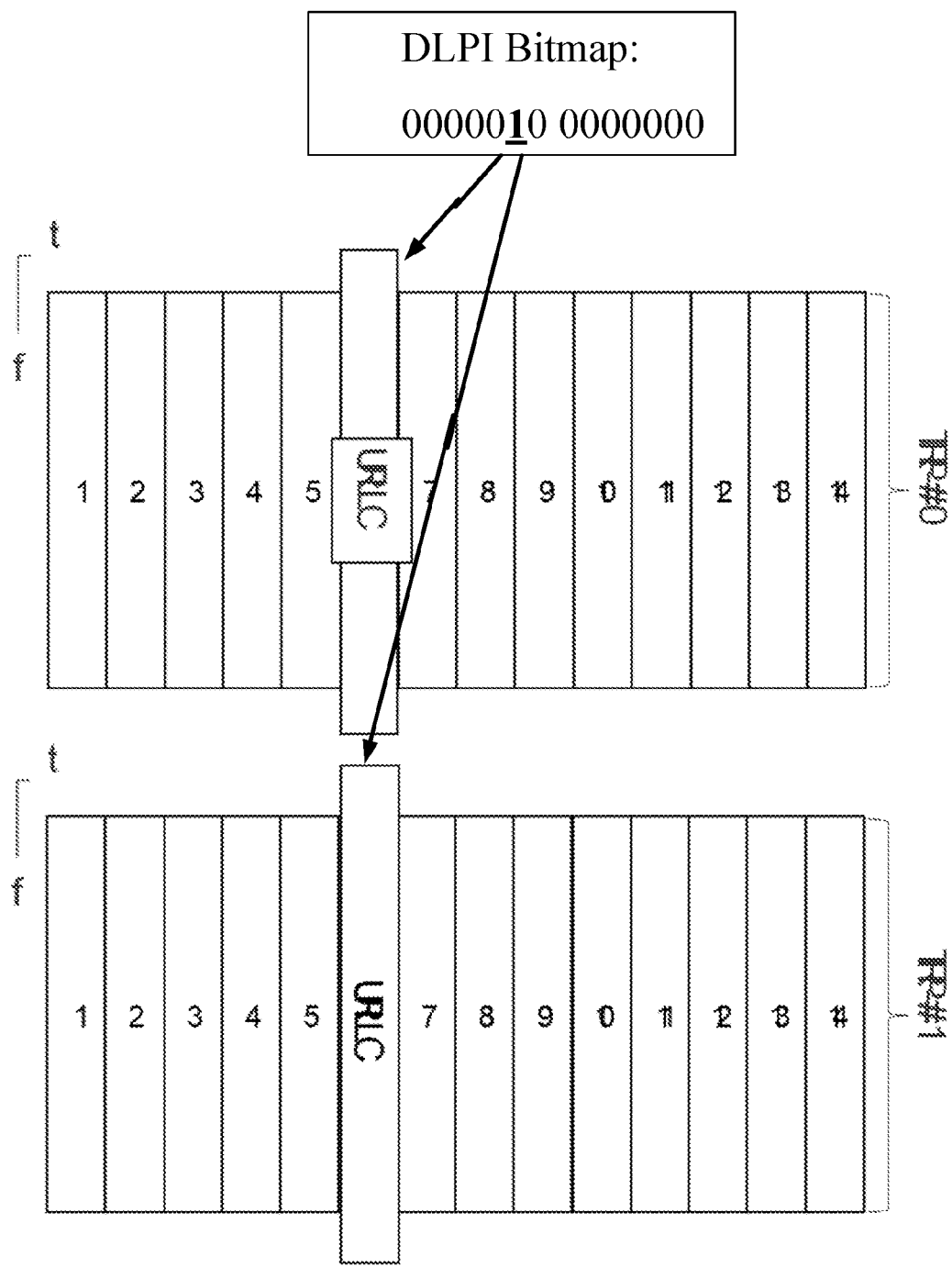

The example shown in FIG. 12 illustrates preemption signaling according to Solution C. The example, again, assumes the scenario described above for FIGS. 7 and 10. In the existing approach, the {M,N}={14,1} the indication would be"

"0000010 0000000".

The NW side behavior may be as follows. The URLLC is originally to be transmitted from TRP-#0. To reduce inter-stream-interference, the NW can also puncture the 6th symbol on TRP-#1, as this is also what is to be interpreted by the UE. Since the punctured symbol on TRP-#1 is free, the NW can also transmit the same URLLC signal as on TRP-#0, as shown in FIG. 12, using the same DMRS port for the URLLC UE. Thus the transmit diversity of the URLLC signal can also be enhanced.

As noted above, there may be a linkage to DMRS-port-group-ID or Virtual Cell-ID. In a system, a UE can link the preemption indication regarding a specific TRP to a specific DMRS-port-group-ID associated to the TRP, or to a specific virtual cell-ID associated to the TRP. As noted above, while 2-TRP and 3-TRP scenarios were discussed and solutions involving the addition of certain bits, there is no strict limitation on bit-points. The bit-points listed in the solutions above are only examples and can be changed to any other reasonable combinations.

Different aspects of the solutions, such as payload requirements, may be highlighted via comparisons. For example, the case with 2-TRPs may be considered as an example. If bit-map {M,N}={14,1} is considered, Solution-3 has the same payload size when compared to Solution-5, while Solution-5 can provide a more detailed TRP-specific preemption indication. Solution-4 has an even greater payload size when compared to Solution-5, but the Solution-5 can still provide more detailed TRP-specific preemption indication when compared to Solution-4.

However, this comparison is based on the assumption that all solutions are carried out via DCI. Actually, the extra bits for TRP-specific indication provided by Solution-3 and Solution-4 can also be indicated via RRC. In this case, the DCI payload size is reduced relative to Solution-5, which may only rely on DCI. Similar comparisons and conclusions can be carried out for the 3-TRP case.

Example Embodiments

Embodiment 1: A method for wireless communications by a user equipment (UE), comprising receiving a downlink preemption indication (DLPI) that indicates that resources for a scheduled joint data transmission of a first type from a group of transmitting entities to the UE that overlap with resources for a scheduled data transmission of a second type from at least a first transmitting entity of the group of transmitting entities to the UE are preempted by the scheduled data transmission of the second type on the overlapping resources and processing the joint data transmission in accordance with the preemption indicated by the DLPI.

Embodiment 2: The method of Embodiment 1, wherein each of the transmitting entities in the group is associated with at least one of a virtual cell ID or a demodulation reference signal (DMRS) port group ID.

Embodiment 3: The method of any of Embodiments 1-2, wherein the first type of data transmission comprises an enhanced mobile broadband (eMBB) data transmission; and the second type of data transmission comprises an ultra-reliable low latency communication (URLLC) data transmission.

Embodiment 4: The method of any of Embodiments 1-3, wherein the DLPI includes one or more bits that identify which of the group of transmitting entities the preemption indication applies to.

Embodiment 5: The method of Embodiment 4, wherein the one or more bits comprise a single bit, a first value of the bit indicates the preemption indication applies to a first transmitting entity of the group but not a second transmitting entity of the group, and a second value of the bit indicates the preemption indication applies to the second transmitting entity but not the first transmitting entity.

Embodiment 6: The method of any of Embodiments 4-5, wherein the one or more bits comprise a single bit a first value of the bit indicates the preemption indication applies to only one of the group of transmitting entities and a second value of the bit indicates the preemption indication applies to all of the group of transmitting entities.

Embodiment 7: The method of any of Embodiments 4-6, wherein the one or more bits comprise at least two bits, a first combination of values of the at least two bits indicates the preemption indication applies to a first subset of the group of transmitting entities, and a second combination of values of the at least two bits indicates the preemption indication applies to a second subset of the group of transmitting entities.

Embodiment 8: The method of any of Embodiments 4-7, wherein each of the one or more bits indicates whether a corresponding bit in a time-frequency preemption bit map applies to a first transmitting entity or a second transmitting entity in the group.

Embodiment 9: The method of any of Embodiments 4-8, wherein each of the one or more bits indicates whether a corresponding bit in a time-frequency preemption bit map applies to a single transmitting entity or all transmitting entities in the group.

Embodiment 10: The method of any of Embodiments 4-9, wherein the one or more bits comprise at least two bits for each bit in a time-frequency preemption bit map, a first combination of values of the at least two bits indicates the corresponding bit in the bit map applies to a first subset of the group of transmitting entities, and a second combination of values of the at least two bits indicates the corresponding bit in the bit map applies to a second subset of the group of transmitting entities.

Embodiment 11: The method of any of Embodiments 1-10, wherein each of transmitting entity in the group has an associated time-frequency preemption bit map.

Embodiment 12: The method of Embodiment 11, wherein each transmitting entity in the group has an associated radio Network Temporary Identifier (RNTI) and an indication of which transmitting entity a bit map applies to is provided by scrambling that transmitting entity with the RNTI of the associated transmitting entity.

Embodiment 13: The method of any of Embodiments 11-12, wherein the preemption bitmap for each transmitting entity in the group is transmitted via a single group common downlink control information (GC-DCI) and each transmitting entity in the group has an associated index indicating a location of its transmitting entity in the GC-DCI.

Embodiment 14: The method of any of Embodiments 1-13, wherein the DLPI is provided via a time-frequency preemption bit map that is interpreted differently for transmitting entity specific DLPI than DLPI that is not transmitting entity specific.

Embodiment 15: The method of Embodiment 14, wherein the bitmap comprises sets of bits, each associated with one or more symbols and each set of bits indicates which of the group of transmitting entities the preemption for the associated symbols applies to.

Embodiment 16: The method of Embodiment 15, wherein a first combination of values of a set of bits indicates preemption for the associated symbols applies to a first subset of the group of transmitting entities and a second combination of values of the set of bits indicates preemption for the associated symbols applies to a second subset of the group of transmitting entities.

Embodiment 17: The method of any of Embodiments 14-16, comprising receiving an indication of how the bitmap is to be interpreted by the UE based on a scrambling of the bitmap with a radio Network Temporary Identifier (RNTI) associated with transmitting entity specific DLPI.

Embodiment 18: A method for wireless communications by a network entity, comprising determining resources for a scheduled joint data transmission of a first type from a group of transmitting entities to a user equipment (UE) overlap with resources for a scheduled data transmission of a second type from at least a first transmitting entity of the group of transmitting entities to the UE and providing a downlink preemption indication (DLPI) to the UE that indicates that, for at least the first transmitting entity, the scheduled data transmission of the second type preempts the scheduled data transmission of the first type on the overlapping resources.

Embodiment 19: The method of Embodiment 18, wherein each of the transmitting entities in the group is associated with at least one of a virtual cell ID or a demodulation reference signal (DMRS) port group ID.

Embodiment 20: The method of any of Embodiments 18-19, wherein the first type of data transmission comprises an enhanced mobile broadband (eMBB) data transmission and the second type of data transmission comprises an ultra-reliable low latency communication (URLLC) data transmission.

Embodiment 21: The method of any of Embodiments 18-20, wherein the DLPI includes one or more bits that identify which of the group of transmitting entities the preemption indication applies to.

Embodiment 22: The method of Embodiment 21, wherein the one or more bits comprise a single bit, a first value of the bit indicates the preemption indication applies to a first transmitting entity of the group but not a second transmitting entity of the group, and a second value of the bit indicates the preemption indication applies to the second transmitting entity but not the first transmitting entity.

Embodiment 23: The method of any of Embodiments 21-22, wherein the one or more bits comprise a single bit, a first value of the bit indicates the preemption indication applies to only one of the group of transmitting entities, and a second value of the bit indicates the preemption indication applies to all of the group of transmitting entities.

Embodiment 24: The method of any of Embodiments 21-23, wherein the one or more bits comprise at least two bits, a first combination of values of the at least two bits indicates the preemption indication applies to a first subset of the group of transmitting entities, and a second combination of values of the at least two bits indicates the preemption indication applies to a second subset of the group of transmitting entities.

Embodiment 25: The method of any of Embodiments 21-24, wherein each of the one or more bits indicates whether a corresponding bit in a time-frequency preemption bit map applies to a first transmitting entity or a second transmitting entity in the group.

Embodiment 26: The method of any of Embodiments 21-25, wherein each of the one or more bits indicates whether a corresponding bit in a time-frequency preemption bit map applies to a single transmitting entity or all transmitting entities in the group.

Embodiment 27: The method of any of Embodiments 18-26, wherein each of transmitting entity in the group has an associated time-frequency preemption bit map.

Embodiment 28: The method of any of Embodiments 18-27, wherein the DLPI is provided via a time-frequency preemption bit map that is interpreted differently for transmitting entity specific DLPI than DLPI that is not transmitting entity specific.

Embodiment 29: An apparatus for wireless communications by a user equipment (UE), comprising means for determining resources for a scheduled joint data transmission of a first type from a group of transmitting entities to a user equipment (UE) overlap with resources for a scheduled data transmission of a second type from at least a first transmitting entity of the group of transmitting entities to the UE and means for providing a downlink preemption indication (DLPI) to the UE that indicates that, for at least the first transmitting entity, the scheduled data transmission of the second type preempts the scheduled data transmission of the first type on the overlapping resources.

Embodiment 30: An apparatus for wireless communications by a network entity, comprising means for receiving a downlink preemption indication (DLPI) that indicates that resources for a scheduled joint data transmission of a first type from a group of transmitting entities to the UE that overlap with resources for a scheduled data transmission of a second type from at least a first transmitting entity of the group of transmitting entities to the UE are preempted by the scheduled data transmission of the second type on the overlapping resources and means for processing the joint data transmission in accordance with the preemption indicated by the DLPI.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 800 of FIG. 8 may be performed by the various processors of the base station 110 shown in FIG. 4, while operations 900 of FIG. 9 may be performed by the various processors of the base station 120 shown in FIG. 4

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 10 and FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RANI, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   receiving a downlink preemption indication (DLPI) that indicates that resources for a scheduled joint data transmission of a first type from a group of transmitting entities to the UE that overlap with resources for a scheduled data transmission of a second type from at least a first transmitting entity of the group of transmitting entities to the UE are preempted by the scheduled data transmission of the second type on the overlapping resources; and
   processing the joint data transmission in accordance with the preemption indicated by the DLPI.

2. The method of claim 1, wherein each of the transmitting entities in the group is associated with at least one of a virtual cell ID or a demodulation reference signal (DMRS) port group ID.

3. The method of claim 1, wherein:
   the first type of data transmission comprises an enhanced mobile broadband (eMBB) data transmission; and
   the second type of data transmission comprises an ultra-reliable low latency communication (URLLC) data transmission.

4. The method of claim 1, wherein the DLPI includes one or more bits that identify which of the group of transmitting entities the preemption indication applies to.

5. The method of claim 4, wherein:
   the one or more bits comprise a single bit;
   a first value of the bit indicates the preemption indication applies to a first transmitting entity of the group but not a second transmitting entity of the group; and
   a second value of the bit indicates the preemption indication applies to the second transmitting entity but not the first transmitting entity.

6. The method of claim 4, wherein:
   the one or more bits comprise a single bit;
   a first value of the bit indicates the preemption indication applies to only one of the group of transmitting entities; and
   a second value of the bit indicates the preemption indication applies to all of the group of transmitting entities.

7. The method of claim 4, wherein:
   the one or more bits comprise at least two bits;
   a first combination of values of the at least two bits indicates the preemption indication applies to a first subset of the group of transmitting entities; and
   a second combination of values of the at least two bits indicates the preemption indication applies to a second subset of the group of transmitting entities.

8. The method of claim 4, wherein:
   each of the one or more bits indicates whether a corresponding bit in a time-frequency preemption bit map applies to a first transmitting entity or a second transmitting entity in the group.

9. The method of claim 4, wherein:
   each of the one or more bits indicates whether a corresponding bit in a time-frequency preemption bit map applies to a single transmitting entity or all transmitting entities in the group.

10. The method of claim 4, wherein:
    the one or more bits comprise at least two bits for each bit in a time-frequency preemption bit map;
    a first combination of values of the at least two bits indicates the corresponding bit in the bit map applies to a first subset of the group of transmitting entities; and a second combination of values of the at least two bits indicates the corresponding bit in the bit map applies to a second subset of the group of transmitting entities.

11. The method of claim 1, wherein:
each of transmitting entity in the group has an associated time-frequency preemption bit map.

12. The method of claim 11, wherein:
each transmitting entity in the group has an associated radio Network Temporary Identifier (RNTI); and
an indication of which transmitting entity a bit map applies to is provided by scrambling that transmitting entity with the RNTI of the associated transmitting entity.

13. The method of claim 11, wherein:
the preemption bitmap for each transmitting entity in the group is transmitted via a single group common downlink control information (GC-DCI); and
each transmitting entity in the group has an associated index indicating a location of its transmitting entity in the GC-DCI.

14. The method of claim 1, wherein the DLPI is provided via a time-frequency preemption bit map that is interpreted differently for transmitting entity specific DLPI than DLPI that is not transmitting entity specific.

15. The method of claim 14, wherein:
the bitmap comprises sets of bits, each associated with one or more symbols; and
each set of bits indicates which of the group of transmitting entities the preemption for the associated symbols applies to.

16. The method of claim 15, wherein:
a first combination of values of a set of bits indicates preemption for the associated symbols applies to a first subset of the group of transmitting entities; and
a second combination of values of the set of bits indicates preemption for the associated symbols applies to a second subset of the group of transmitting entities.

17. The method of claim 14, comprising:
receiving an indication of how the bitmap is to be interpreted by the UE based on a scrambling of the bitmap with a radio Network Temporary Identifier (RNTI) associated with transmitting entity specific DLPI.

18. A method for wireless communication by a network entity, comprising:
determining resources for a scheduled joint data transmission of a first type from a group of transmitting entities to a user equipment (UE) overlap with resources for a scheduled data transmission of a second type from at least a first transmitting entity of the group of transmitting entities to the UE; and
providing a downlink preemption indication (DLPI) to the UE that indicates that, for at least the first transmitting entity, the scheduled data transmission of the second type preempts the scheduled data transmission of the first type on the overlapping resources.

19. The method of claim 18, wherein each of the transmitting entities in the group is associated with at least one of a virtual cell ID or a demodulation reference signal (DMRS) port group ID.

20. The method of claim 18, wherein:
the first type of data transmission comprises an enhanced mobile broadband (eMBB) data transmission; and
the second type of data transmission comprises an ultra-reliable low latency communication (URLLC) data transmission.

21. The method of claim 18, wherein the DLPI includes one or more bits that identify which of the group of transmitting entities the preemption indication applies to.

22. The method of claim 21, wherein:
the one or more bits comprise a single bit;
a first value of the bit indicates the preemption indication applies to a first transmitting entity of the group but not a second transmitting entity of the group; and
a second value of the bit indicates the preemption indication applies to the second transmitting entity but not the first transmitting entity.

23. The method of claim 21, wherein:
the one or more bits comprise a single bit;
a first value of the bit indicates the preemption indication applies to only one of the group of transmitting entities; and
a second value of the bit indicates the preemption indication applies to all of the group of transmitting entities.

24. The method of claim 21, wherein:
the one or more bits comprise at least two bits;
a first combination of values of the at least two bits indicates the preemption indication applies to a first subset of the group of transmitting entities; and
a second combination of values of the at least two bits indicates the preemption indication applies to a second subset of the group of transmitting entities.

25. The method of claim 21, wherein:
each of the one or more bits indicates whether a corresponding bit in a time-frequency preemption bit map applies to a first transmitting entity or a second transmitting entity in the group.

26. The method of claim 21, wherein:
each of the one or more bits indicates whether a corresponding bit in a time-frequency preemption bit map applies to a single transmitting entity or all transmitting entities in the group.

27. The method of claim 18, wherein:
each of transmitting entity in the group has an associated time-frequency preemption bit map.

28. The method of claim 18, wherein the DLPI is provided via a time-frequency preemption bit map that is interpreted differently for transmitting entity specific DLPI than DLPI that is not transmitting entity specific.

29. An apparatus for wireless communication by a network entity, comprising:
means for determining resources for a scheduled joint data transmission of a first type from a group of transmitting entities to a user equipment (UE) overlap with resources for a scheduled data transmission of a second type from at least a first transmitting entity of the group of transmitting entities to the UE; and
means for providing a downlink preemption indication (DLPI) to the UE that indicates that, for at least the first transmitting entity, the scheduled data transmission of the second type preempts the scheduled data transmission of the first type on the overlapping resources.

30. An apparatus for wireless communication by a user equipment (UE), comprising:
means for receiving a downlink preemption indication (DLPI) that indicates that resources for a scheduled joint data transmission of a first type from a group of transmitting entities to the UE that overlap with resources for a scheduled data transmission of a second type from at least a first transmitting entity of the group of transmitting entities to the UE are preempted by the scheduled data transmission of the second type on the overlapping resources; and means for processing the joint data transmission in accordance with the preemption indicated by the DLPI.

* * * * *